United States Patent
Sim et al.

(10) Patent No.: US 8,111,908 B2
(45) Date of Patent: Feb. 7, 2012

(54) APPARATUS AND METHOD FOR MATCHING 2D COLOR IMAGE AND DEPTH IMAGE

(75) Inventors: Jee-young Sim, Yongin-si (KR);
Kee-ohang Lee, Yongin-si (KR);
Byong-min Kang, Yongin-si (KR);
Do-kyogn Kim, Seongnam-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 999 days.

(21) Appl. No.: 12/076,279

(22) Filed: Mar. 14, 2008

(65) Prior Publication Data

US 2009/0067707 A1    Mar. 12, 2009

(30) Foreign Application Priority Data

Sep. 11, 2007  (KR) .......................... 10-2007-0092147

(51) Int. Cl.
*G06K 9/00* (2006.01)
(52) U.S. Cl. .......................... 382/154; 382/254; 345/421
(58) Field of Classification Search .................. 382/154, 382/254

See application file for complete search history.

(56) References Cited

U.S. PATENT DOCUMENTS

| | | | |
|---|---|---|---|
| 5,438,437 A * | 8/1995 | Mizoguchi et al. ........... | 358/518 |
| 5,767,857 A * | 6/1998 | Neely ........................... | 345/427 |
| 6,856,314 B2 * | 2/2005 | Ng ................................ | 345/421 |
| 7,031,512 B2 * | 4/2006 | Ng ................................ | 382/154 |
| 7,420,156 B2 * | 9/2008 | Kim et al. ..................... | 250/226 |
| 7,711,201 B2 * | 5/2010 | Wong et al. ................... | 382/254 |
| 7,774,075 B2 * | 8/2010 | Lin ................................ | 700/17 |

* cited by examiner

*Primary Examiner* — Hadi Akhavannik
(74) *Attorney, Agent, or Firm* — Staas & Halsey LLP

(57) ABSTRACT

Provided are an apparatus and method for matching a 2D color image and a depth image to obtain 3D information. The method includes matching resolution of the 2D color image and resolution of a light intensity image, wherein the 2D color image and the light intensity image are separately obtained, detecting at least one edge from the matched 2D color image and the matched light intensity image, and matching overlapping pixels of the matched 2D color image and a depth image, which corresponds to the matched light intensity image, with each other in case that the matched 2D color image and the depth image are overlapped as much as the matched 2D color image and the matched light intensity image are overlapped so that the detected edges of the matched 2D color image and the detected edges of the matched light intensity image are maximally overlapped with each other. Accordingly, the 2D color image and the depth image can be accurately matched so that reliable 3D image information can be quickly obtained.

18 Claims, 7 Drawing Sheets

(1 of 7 Drawing Sheet(s) Filed in Color)

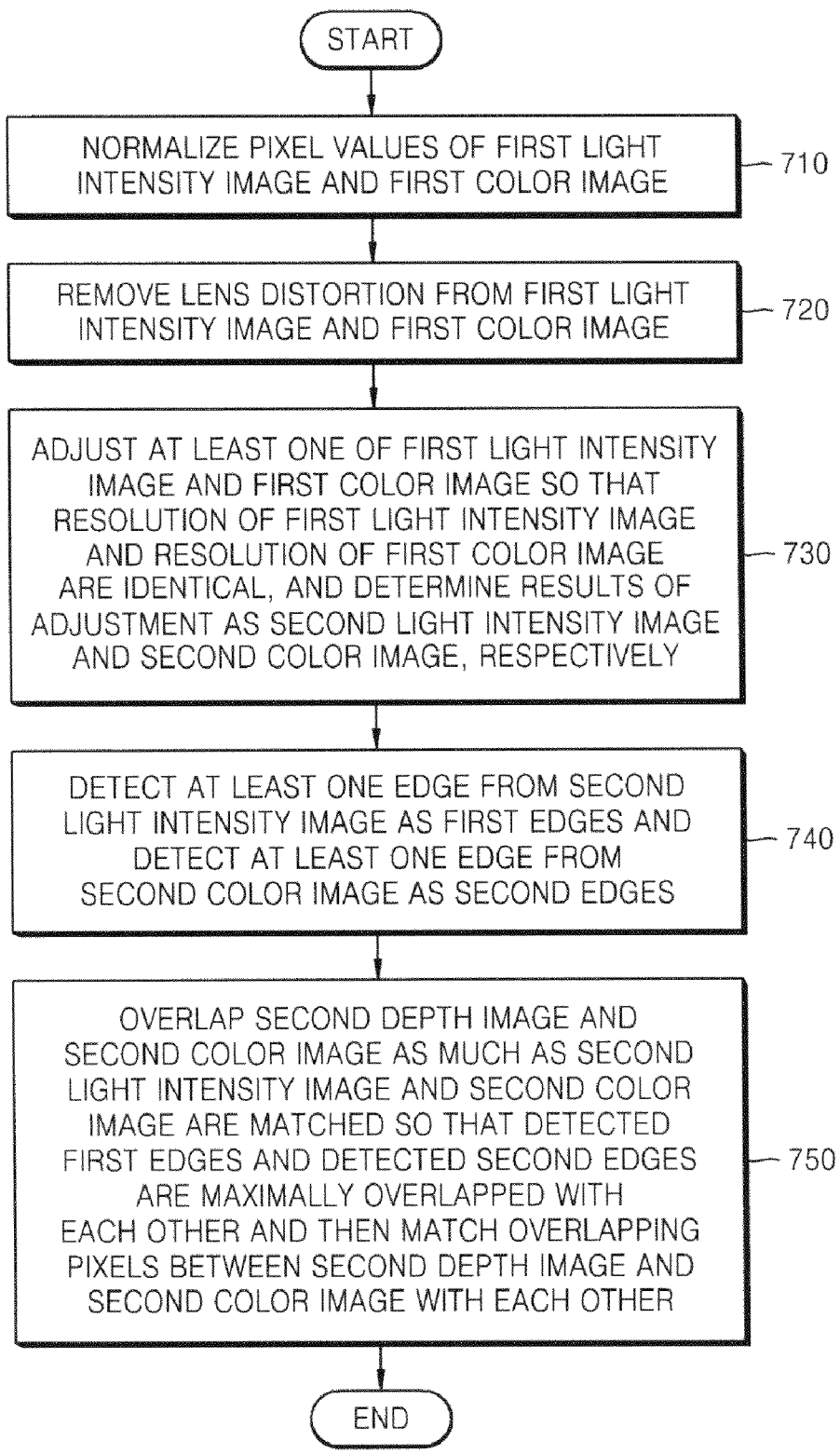

APPARATUS AND METHOD FOR MATCHING 2D COLOR IMAGE AND DEPTH IMAGE

CROSS-REFERENCE TO RELATED PATENT APPLICATION

This application claims the benefit of Korean Patent Application No. 10-2007-0092147, filed on Sep. 11, 2007, in the Korean Intellectual Property Office, the disclosure of which is incorporated herein in its entirety by reference.

BACKGROUND OF THE INVENTION

1. Field of the Invention

The present invention relates to obtaining 3D information, and more particularly, to an apparatus and method for matching a depth image and a 2D color image to obtain 3D information.

2. Description of the Related Art

In a conventional compact camera, which employs a charge coupled device (CCD) or a complementary metal oxide semiconductor (CMOS), (hereinafter, referred to as a CCD/CMOS camera) when a photographing button in the CCD/CMOS camera is operated, the CCD/CMOS obtains a 2D color image of a subject by detecting visible rays reflected from the subject that receives sunlight or artificial light.

Also, when a photographing button in a depth camera is operated, the depth camera obtains a depth image of a subject, by irradiating infrared rays on the subject, calculating depth of each point of the subject considering points of time at which the infrared rays are irradiated and points of time at which the infrared rays reflected from the point are detected, and expressing the calculated depths in an image. Here, the depth denotes a distance between a point of the subject and the depth camera.

3D image information of the subject can be obtained by using a 2D color image of the subject and a depth image of the subject.

When a photographer photographs a subject twice using the CCD/CMOS camera and the depth camera, respectively, the subjects in the 2D color image and the depth image are generally different since specifications of the CCD/CMOS camera and the depth camera, such as a view angle and a focal distance, are different. Moreover, locations of the CCD/CMOS camera and the depth camera minutely differ whenever the subject is photographed due to hand shaking of the photographer, and thus the subjects in the 2D color image and the depth image are rarely identical. Even if the subjects in the 2D color image and the depth image are identical, the resolutions set in the CCD/CMOS camera and the depth camera are different. As a result, it is not easy to quickly and accurately determine which pixels forming the 2D color image match pixels forming the depth image.

Accordingly, a method of quickly and accurately matching the 2D color image and the depth image is required so that reliable 3D image information can be quickly obtained by using the separately obtained 2D color image and depth image.

SUMMARY OF THE INVENTION

The present invention provides an apparatus for quickly and accurately matching a 2D color image and a depth image which are separately obtained, so that reliable 3D image information can be quickly obtained using the 2D color image and the depth image.

The present invention also provides a method of quickly and accurately matching a 2D color image and a depth image which are separately obtained, so that reliable 3D image information can be quickly obtained using the 2D color image and the depth image.

The present invention also provides a computer readable recording medium having recorded thereon a program for executing a method of quickly and accurately matching a 2D color image and a depth image which are separately obtained, so that reliable 3D image information can be quickly obtained using the 2D color image and the depth image.

According to an aspect of the present invention, there is provided an image matching apparatus for matching a 2D image and a depth image, the apparatus including: a resolution converter, which adjusts at least one of a first light intensity image, which corresponds to a first depth image, and a first color image, so that resolution of the first light intensity image and resolution of the first color image are identical, and outputting the adjusted first light intensity image and first color image as a second light intensity image and a second color image, respectively; an edge detector, which receives the second light intensity image and the second color image, detects at least one edge of the second light intensity image as first edges, and detects at least one edge of the second color image as second edges; and a matcher, which matches overlapping pixels of a second depth image, which corresponds to the second light intensity image, and the second color image with each other in case that the second depth image and the second color image are overlapped as much as the second light intensity image and the second color image are overlapped so that the detected first edges and the detected second edges are maximally overlapped with each other.

According to another aspect of the present invention, there is provided an image matching method including: adjusting at least one of a first light intensity image, which correspond to a first depth image, and a first color image so that resolution of the first light intensity image and resolution of the first color image are identical, and determining the adjusted first light intensity image and first color image as a second light intensity image and a second color image, respectively; detecting at least one edge of the second light intensity image as first edges, and detecting at least one edge of the second color image as second edges; and matching overlapping pixels of a second depth image, which corresponds to the second light intensity image, and the second color image with each other in case that the second depth image and the second color image are overlapped as much as the second light intensity image and the second color image are overlapped so that the detected first edges and the detected edges are maximally overlapped with each other.

According to another aspect of the present invention, there is provided a computer readable recording medium having recorded thereon a program for executing the method of above.

BRIEF DESCRIPTION OF THE DRAWINGS

The patent or application file contains at least one drawing executed in color. Copies of this patent or patent application publication with color drawing(s) will be provided by the Office upon request and payment of the necessary fee. The above and other features and advantages of the present invention will become more apparent by describing in detail exemplary embodiments thereof with reference to the attached drawings in which:

FIG. 7 is a flowchart illustrating a method of matching a 2D color image and a depth image, according to an embodiment of the present invention.

DETAILED DESCRIPTION OF THE INVENTION

The attached drawings for illustrating exemplary embodiments of the present invention are referred to in order to gain a sufficient understanding of the present invention, the merits thereof, and the objectives accomplished by the implementation of the present invention.

Hereinafter, the present invention will be described in detail by explaining exemplary embodiments of the invention with reference to the attached drawings.

Figure 1:
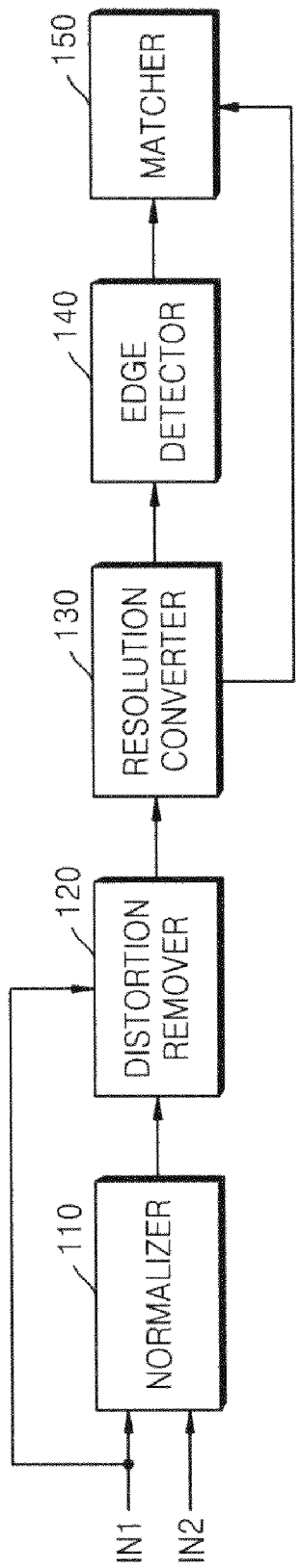
FIG. 1 is a block diagram illustrating an apparatus for matching a 2D color image and a depth image, according to an embodiment of the present invention.

FIG. 1 is a block diagram illustrating an apparatus for matching a 2D color image and a depth image, according to an embodiment of the present invention. Referring to FIG. 1, the apparatus for matching a 2D color image and a depth image according to the current embodiment of the present invention includes a normalizer 110, a distortion remover 120, a resolution converter 130, an edge detector 140, and a matcher 150. Here, each of the normalizer 110 and the distortion remover 120 may not be included in the apparatus.

When a photographing button in a depth camera is operated, the depth camera irradiates infrared rays on a subject, and obtains a light intensity image of the subject, by detecting intensity of the infrared rays reflected from each point of the subject. Thus, when the depth camera obtains a depth image of the subject, the depth camera has already obtained the light intensity image of the subject that shows the depth image. In the specification, a light intensity image corresponding to a depth image denotes a light intensity image of a subject shown by a depth image, and a depth image corresponding to a light intensity image denotes a depth image of a subject shown by a light intensity image. Accordingly, subjects shown in a depth image and a light intensity image corresponding to the depth image are identical, and resolutions of a depth image and a light image corresponding to the depth image are the same.

Meanwhile, after setting a CCD/CMOS camera and a depth camera so that a view angle of the CCD/CMOS camera and a view angle of the depth camera are approximated to a predetermined value, a photographer may obtain a first color image by photographing a scene with the CCD/CMOS camera and then obtain a first light intensity image and a first depth image by photographing the same scene with the depth camera. Here, the first light intensity image denotes a light intensity image photographed by the depth camera and the first depth image denotes a depth image corresponding to the first light intensity image. Thus, the first depth image and the first light intensity image are photographed by the depth camera. Also, like a color photograph image, the first color image denotes a 2D color image photographed by the CCD/CMOS camera. In other words, the first depth image and the first light intensity image are photographed by a different photographing apparatus than that used to photograph the first color image.

The normalizer 110 normalizes pixel values of the first light intensity image received through an input terminal IN1. In detail, the normalizer 110 adjusts the first light intensity image so that a histogram of the first light intensity image received through the input terminal IN1 is uniform. In the histogram of the first light intensity image, the x-axis shows numerical values equating to pixel values, and the y-axis shows the number of pixels, from among pixels forming the first light intensity image, having the same numerical value as a pixel value according to each numerical value on the x-axis. Also, the histogram of the first light intensity image being uniform means that when the numerical values equating to pixel values are divided into a plurality of sections, the number of pixels in each section is the same. Accordingly, the minimum value of the pixel values of the first light intensity image received through the input terminal IN1 is changed to the minimum value of the numerical values equating to pixel values and the maximum value of the pixel values of the first light intensity image is changed to the maximum value of the numerical values equating to pixel values. Thus, when the first light intensity image is generally too dark or too bright, brightness of the first light intensity image can be suitably adjusted.

Similarly, the normalizer 110 normalizes pixel values of the first color image received through an input terminal IN2. In detail, the normalizer 110 adjusts the first color image so that a histogram of the first color image is uniform. In the histogram of the first color image, the x-axis shows numerical values equating to pixel values, and the y-axis shows the number of pixels, from among pixels forming the first color image, having the same numerical value as a pixel value according to each numerical value on the x-axis. Also, the histogram of the first color image being uniform means that when the numerical values possible as pixel values are divided into a plurality of sections, the number of pixels in each section is the same. Accordingly, the minimum value of the pixel values of the first color image received through the input terminal IN2 is changed to the minimum value of the numerical values equating to pixel values and the maximum value of the pixel values of the first color image is changed to the maximum value of the numerical values equating to pixel values. Thus, when the first color image is generally too dark or too bright, brightness of the first color image can be suitably adjusted.

The distortion remover 120 receives the first depth image through the input terminal IN1.

Meanwhile, the distortion remover 120 can receive the first light intensity image through the input terminal IN1 and the first color image through the input terminal IN2. However, for convenience of description, it is assumed that the distortion remover 120 receives the first light intensity image and the first color image from the normalizer 110.

The distortion remover 120 compensates the first light intensity image received from the normalizer 110 so that lens distortion in the first light intensity image is removed, and compensates the first depth image received through the input terminal IN1 so that lens distortion in the first depth image is removed. In the present specification, lens distortion is distortion in an image photographed by a camera, and is generated by a lens equipped in the camera.

Similarly, the distortion remover 120 compensates the first color image received from the normalizer 110 so that lens distortion in the first color image is removed.

The resolution converter 130 may receive the first depth image through the input terminal IN1, and may receive the first light intensity image and the first color image from the normalizer 110. However, for convenience of description, it is assumed that the resolution converter 130 receives the compensated first light intensity image, the compensated first depth image, and the compensated first color image from the distortion remover 120. In other words, each of the first light intensity image, the first depth image, and the first color image received by the resolution converter 130 is an image in which no lens distortion exists.

The resolution converter 130 adjusts at least one of the compensated first light intensity image and the compensated first color image so that resolution of the compensated first light intensity image and resolution of the compensated first color image are identical, and outputs the adjusted first light intensity image and the adjusted first color image respectively as a second light intensity image and a second color image. In detail, the resolution converter 130 re-samples at least one of the first light intensity image and the first color image so that the resolution of the first light intensity image and the resolution of the first color image are identical, and outputs the re-sampled first light intensity image and the re-sampled first color image respectively as a second light intensity image and a second color image. Here, re-sampling may comprise interpolation only, decimation only, or both interpolation and decimation.

If the resolution converter 130 re-samples the first light intensity image so that the resolution of the first light intensity image and the resolution of the first color image are identical, the second light intensity image is the re-sampled first light intensity image and the second color image is the first color image.

Alternatively, if the resolution converter 130 re-samples the first color image so that the resolution of the first light intensity image and the resolution of the first color image are identical, the second light intensity image is the first light intensity image and the second color image is the re-sampled first color image.

Alternatively, if the resolution converter 130 re-samples each of the first light intensity image and the first color image so that the resolution of the first light intensity image and the resolution of the first color image are identical, the second light intensity image is the re-sampled first light intensity image and the second color image is the re-sampled first color image.

As described above, the resolution of the second light intensity image and the resolution of the second color image are identical but the number of pixels forming the second light intensity image and the number of pixels forming the second color image may be different. This is because a view angle of the depth camera that obtained the first light intensity image and a view angle of the CCD/CMOS camera that obtained the first color image may be different. However, since the resolution of the second light intensity image and the resolution of the second color image are identical, the number of pixels in identical portions of the second light intensity image and the second color image is the same. Accordingly in the present specification, when resolution of a first image is identical to resolution of a second image, it does not mean that the number of pixels forming the first image and the number of pixels forming the second image are the same, but the number of pixels in identical portions of the first image and the second image is the same.

The resolution converter 130 applies a technology for obtaining the second light intensity image by using the first light intensity image, to the received first depth image, and may output the result of applying the technology as a second depth image. In the present specification, the second depth image denotes a depth image corresponding to the second light intensity image. For example, when the resolution converter 130 interpolates the first light intensity image by doubling a sampling frequency and outputs the result of interpolation as the second light intensity image, the resolution converter 130 interpolates the first depth image by doubling a sampling frequency and outputs the result of interpolation as the second depth image. Alternatively, when the resolution converter 130 outputs the first light intensity image as the second light intensity image, the resolution converter 130 outputs the first depth image as the second depth image.

The edge detector 140 receives the second light intensity image and the second color image from the resolution converter 130. Then, the edge detector 140 detects at least one edge from the second light intensity image as first edges, and detects at least one edge from the second color image as second edges. In detail, when a change of light intensity in the second light intensity image is equal to or greater than a predetermined threshold value, the edge detector 140 detects continuous points in the second light intensity image as one edge. Similarly, when a change of light intensity in the second color image is equal to or greater than a predetermined threshold value, the edge detector 140 detects continuous points in the second color image as one edge. For example, when a subject shown in the second light intensity image is a building with a plurality of windows, the edge detector 140 may detect a boundary of a concrete surface of the building and a window, which corresponds to points wherein a light intensity change is equal to or greater than a predetermined level in the subject of the second light intensity image, as an edge. Similarly, when a subject shown in the second color image is a building with a plurality of windows, the edge detector 140 may detect a boundary of a concrete surface of the building and a window, which corresponds to points wherein a light intensity change is equal to or greater than a predetermined level in the subject of the second color image, as an edge.

The edge detector 140 generates a first binary image, which shows the detected first edges, and a second binary image, which shows the detected second edges. For example, the edge detector 140 can generate the first binary image by changing each pixel value of pixels forming the second light intensity image to 0 or 1 according to whether the pixels forming the second light intensity image belong to the first edges. Similarly, the edge detector 140 can generate the second binary image by changing each pixel value of pixels forming the second color image to 0 or 1 according to whether the pixels forming the second color image belong to the second edges.

The matcher 150 overlaps the second light intensity image and the second color image with each other so that the detected first edges and the detected second edges overlap to a maximum. In detail, the matcher 150 receives the first binary image and the second binary image from the edge detector 140, and overlaps the second light intensity image and the second color image with each other so that overlapping images between the received first binary image and second binary image are maximally identical. Then, the matcher 150 overlaps the second depth image and the second color image with each other as much as the second light intensity image and the second color image are overlapped, and then matches overlapping pixels between the second depth image and the second color image with each other.

3D location information of one pixel in the second color image is determined based on 2D location information and a depth value of another pixel in the second depth image matched to the one pixel in the second color image. Accordingly, 3D image information comprising 3D location information and color information can be obtained by using the second depth image and the second color image.

According to the present invention, the second light intensity image and the second color image are determined by using the first light intensity image corresponding to the first depth image and the first color image, the first edges are detected from the second light intensity image and the second edges are detected from the second color image, overlapping pixels between the second depth image and the second color image are matched with each other in case that the second depth image and the second color image are overlapped with each other as much as the second light intensity image and the second color image are overlapped with each other so that the detected first edges and the detected second edges are maximally overlapped with each other, and 3D image information is generated considering pixel values of pixels of the second depth image and pixel values of pixels of the second color image matched to the pixels of the second depth image. Accordingly, 3D image information comprising 3D location information and color information can be quickly and accurately obtained by using the first depth image and the first color image.

Figure 2A:
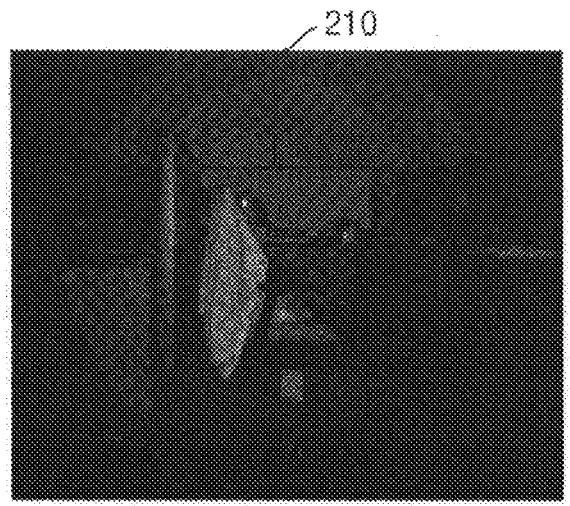
FIGS. 2A and 2B are photographic images for describing a normalizer of the apparatus illustrated in FIG. 1, according to an embodiment of the present invention.
Figure 2B:
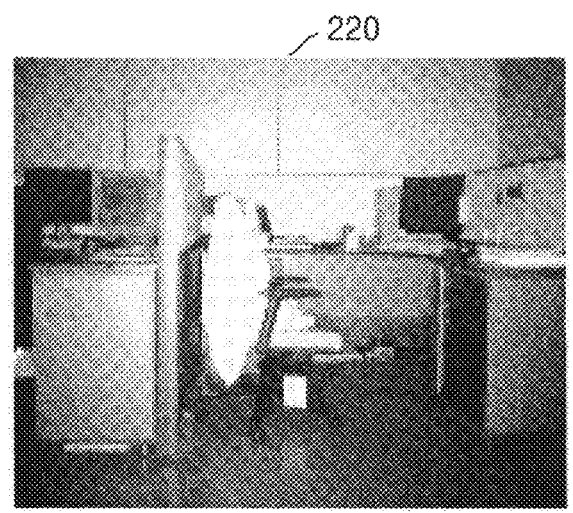

FIGS. 2A and 2B are photographic images for describing the normalizer 110 of the apparatus illustrated in FIG. 1, according to an embodiment of the present invention.

Referring to FIGS. 2A and 2B, the normalizer 110 receives a first light intensity image 210, adjusts brightness of the first light intensity image 210 by normalizing pixel values of the received first light intensity image 210, and outputs the result of adjustment as a first light intensity image 220.

Figure 3A:
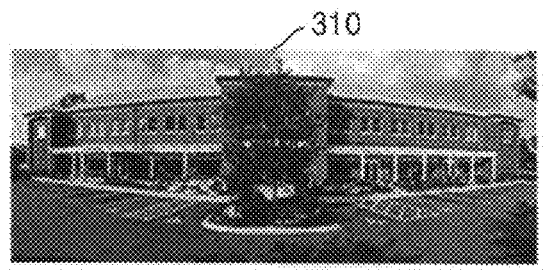
FIGS. 3A and 3B are photographic images for describing a distortion remover of the apparatus illustrated in FIG. 1, according to an embodiment of the present invention.
Figure 3B:
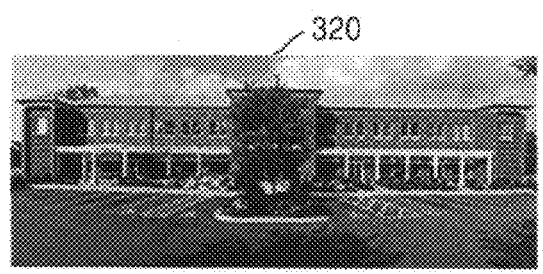

FIGS. 3A and 3B are photographic images for describing the distortion remover 120 of the apparatus illustrated in FIG. 1, according to an embodiment of the present invention.

Referring to FIGS. 3A and 3B, the distortion remover 120 compensates a first color image 310 so as to remove lens distortion in the first color image 310, and thus generates a first color image 320, in which the lens distortion is removed.

Figure 4:
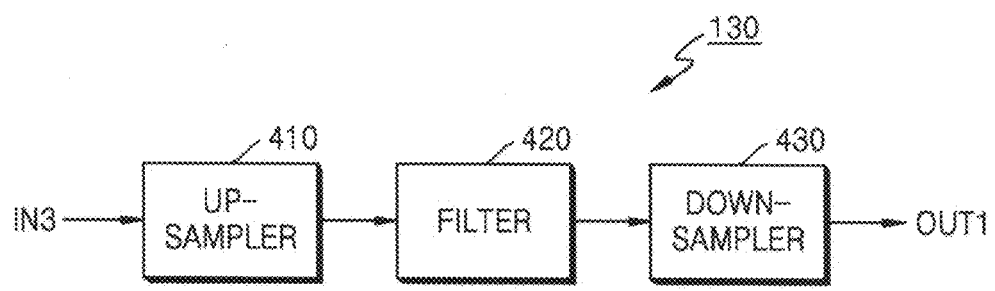
FIG. 4 is a block diagram illustrating a resolution converter of the apparatus illustrated in FIG. 1, according to an embodiment of the present invention.

FIG. 4 is a block diagram illustrating the resolution converter 130 of the apparatus illustrated in FIG. 1, according to an embodiment of the present invention. Referring to FIG. 4, the resolution converter 130 according to the current embodiment of the present invention includes an up-sampler 410, a filter 420, and a down-sampler 430. Hereinafter, for convenience of description, the resolution of the first light intensity image is 2, the resolution of the first depth image is 2, and the resolution of the first color image is 3. Also, it is assumed that the resolution converter 130 re-samples the first light intensity image so that the resolution of the first light intensity image is identical to the resolution of the first color image.

Referring again to FIG. 4, the resolution converter 130 receives the first color image through an input terminal IN3, and outputs the received first color image as the second color image. Here, lens distortion may not exist in the received first color image.

Meanwhile, the resolution converter 130 may also receive the first depth image and the first light intensity image through the input terminal IN3, and re-samples each of the received first light intensity image and first depth image. Here, lens distortion may not exist in the received first light intensity image and first depth image. Operations of the resolution converter 130 will now be described in detail.

The up-sampler 410 up-samples the received first light intensity image and first depth image by tripling sampling frequencies. In other words, the up-sampler 410 triples the number of pixels in each of the received first light intensity image and first depth image. In detail, the up-sampler 410 expresses each pixel forming the received first light intensity image as two pixels, wherein one pixel has a pixel value of the corresponding pixel and another pixel has a pixel value 0. Similarly, the up-sampler 410 expresses each pixel forming the received first depth image as two pixels, wherein one pixel has a pixel value of the corresponding pixel and another pixel has a pixel value 0. Accordingly, the resolutions of the received first light intensity image and first depth image increase from 2 to 6.

The filter 420 performs low pass filtering (LPF) on the up-sampled first light intensity image and the up-sampled first depth image according to a preset filter coefficient in order to guarantee that an aliasing does not exist in each of the up-sampled first light intensity image and the up-sampled first depth image.

Also, even when the first light intensity image and the first depth image are down-sampled by the down-sampler 430 as will be described later, the filter 420 performs LPF on the first light intensity image and the first depth image according to the preset filter coefficient in order to guarantee that an aliasing does not exist in each of the up-sampled first light intensity image and the up-sampled first depth image.

By performing LPF on the first light intensity image, the filter 420 adjusts each pixel value of the pixels forming the first light intensity image to be approximated to be equal to or more than a preset approximation with each pixel value of pixels adjacent to the pixels forming the first light intensity image. Similarly, by performing LPF on the first depth image, the filter 420 adjusts each pixel value of the pixels forming the first depth image to be approximated to be equal to or more than the preset approximation with each pixel value of pixels adjacent to the pixels forming the first depth image.

The down-sampler 430 down-samples the filtered first light intensity image and the filtered first depth image by halving sampling frequencies. In other words, the down-sampler 430 reduces the numbers of pixels of the filtered first light intensity image and the filtered first depth image by half. In detail, the down-sampler 430 expresses two adjacent pixels from among the pixels forming the filtered first light intensity image to one pixel having a pixel value of one of the two adjacent pixels. Similarly, the down-sampler 430 expresses two adjacent pixels from among the pixels forming the filtered first color image to one pixel having a pixel value of one of the two adjacent pixels. Accordingly, the resolutions of the filtered first light intensity image and the filtered first depth image are reduced from 6 to 3.

In this case, the down-sampler 430 outputs the down-sampled first light intensity image as the second light intensity image through an output terminal OUT1, and outputs the down-sampled first depth image as the second depth image through the output terminal OUT1.

In the resolution converter 130 of FIG. 4 according to the current embodiment of the present invention, all of the up-sampler 410, the filter 420, and the down-sampler 430 operate so as to make the resolution of the first light intensity image and the resolution of the first color image identical. However, in other embodiments, only the up-sampler 410 and the filter 420 may operate or only the filter 420 and the down-sampler 430 may operate so as to make the resolution of the first light intensity image and the resolution of the first color image identical.

In detail, when the resolution converter 130 interpolates an image, only the up-sampler 410 and the filter 420 operate, and when the resolution converter 130 decimates an image, only the filter 420 and the down-sampler 430 operate.

Figure 5A:
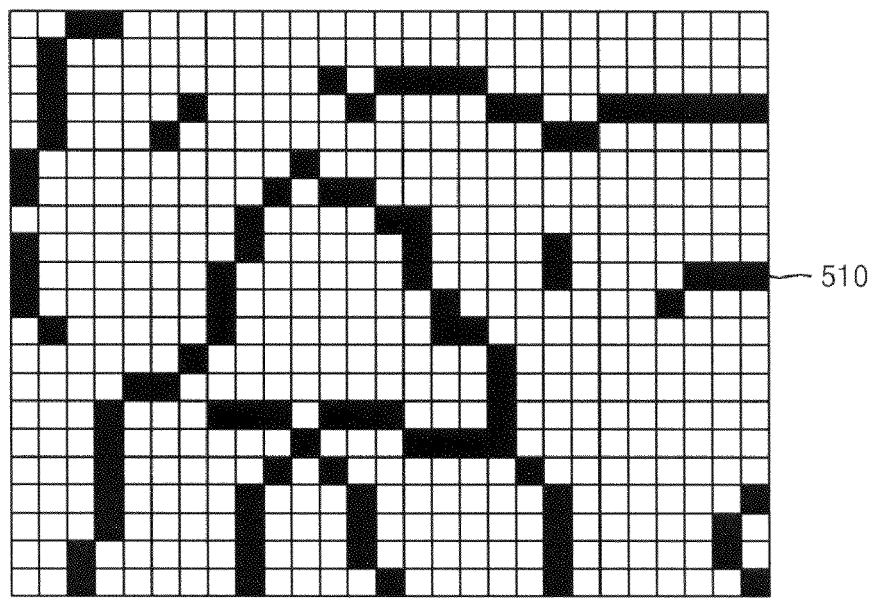
FIGS. 5A and 5B are diagrams for describing operations of an edge detector of the apparatus illustrated in FIG. 1, according to an embodiment of the present invention.
Figure 5B:
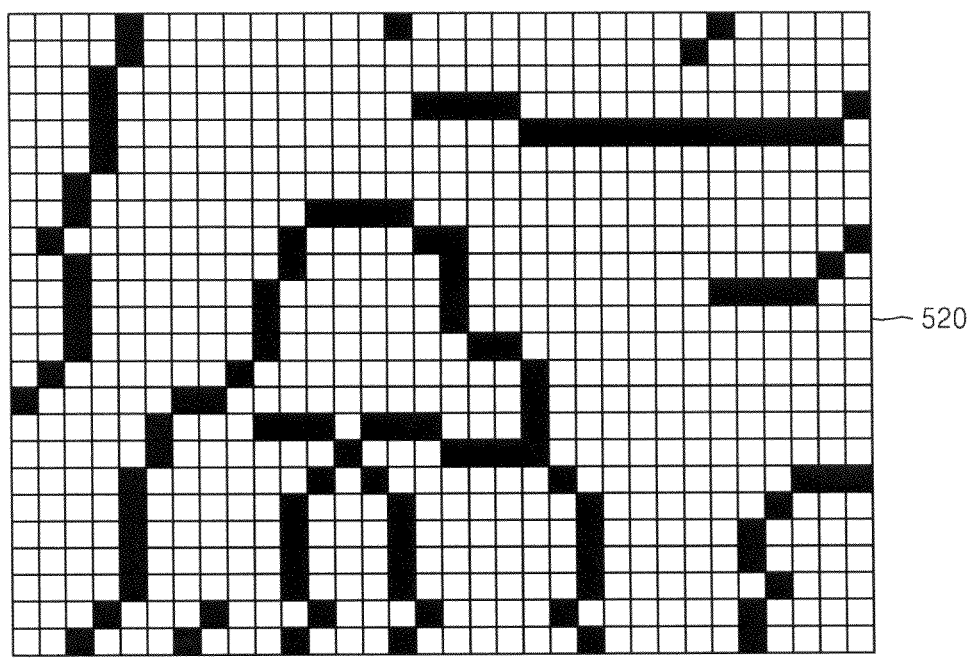

FIGS. 5A and 5B are diagrams for describing operations of the edge detector 140 of the apparatus illustrated in FIG. 1, according to an embodiment of the present invention.

Referring to FIGS. 5A and 5B, the edge detector 140 detects at least one edge from the second light intensity image received from the resolution converter 130 as first edges, detects at least one edge from the second color image received from the resolution converter 130 as second edges, generates a first binary image 510 which shows the detected first edges, and generates a second binary image 520 which shows the detected second edges.

Figure 6:
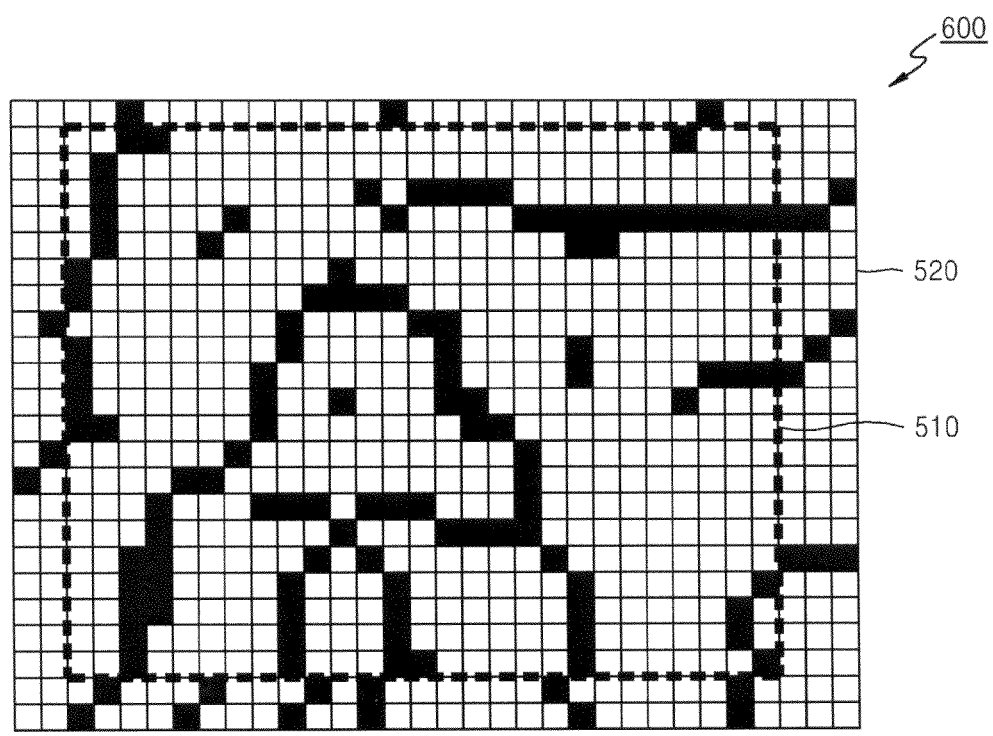
FIG. 6 is a diagram for describing operations of a matcher of the apparatus illustrated in FIG. 1, according to an embodiment of the present invention.

FIG. 6 is a diagram for describing operations of the matcher 150 of the apparatus illustrated in FIG. 1, according to an embodiment of the present invention.

Referring to FIG. 6, the matcher 150 overlaps the first binary image 510 and the second binary image 520 with each other so that overlapping portions of the first binary image 510 and the second binary image 520 received from the edge detector 410 are maximally identical to each other, and then matches a pixel in the second binary image 520 and a facing pixel in the first binary image 510 with each other. A reference numeral 600 denotes a result of overlapping the first binary image 510 and the second binary image 520 so that the overlapping portions of the first binary image 510 and the second binary image 520 are maximally identical to each other.

FIG. 7 is a flowchart illustrating a method of matching a 2D color image and a depth image using the apparatus of FIG. 1, according to an embodiment of the present invention. Referring to FIG. 7, the method of matching a 2D color image and a depth image according to the current embodiment of the present invention includes operations 710 through 750, wherein a 2D color image and a depth image, which are obtained separately, are quickly and accurately matched so that reliable 3D image information can be quickly obtained by using the 2D color image and the depth image.

In operation 710, the normalizer 110 normalizes pixel values of a first light intensity image and a first color image.

In operation 720, the distortion remover 120 removes lens distortion from each of a first depth image, the first light intensity image normalized in operation 710, and the first color image normalized in operation 710.

In operation 730, the resolution converter 130 adjusts at least one of the lens distortion removed first light intensity image and the lens distortion removed first color image so that the resolution of the lens distortion removed first light intensity image and the resolution of the lens distortion removed first color image are identical, and determines the adjusted results as the second light intensity image and the second color image.

In operation 730, the resolution converter 130 applies a technology to the lens distortion removed first depth image, for obtaining the second light intensity image by using the first light intensity image, and determines the result of application as the second depth image.

Then, in operation 740, the edge detector 140 detects at least one edge from the second light intensity image as first edges and detects at least one edge from the second color image as second edges.

In operation 750, the matcher 150 overlaps the second light intensity image and the second color image so that the first edges and the second edges maximally overlap with each other, overlaps the second depth image and the second color image with each other as much as the second light intensity image and the second color image are overlapped with each other, and matches overlapping pixels between the second depth image and the second color image with each other.

The embodiments of the present invention can be written as computer programs and can be implemented in general-use digital computers that execute the programs using a computer readable recording medium. Examples of the computer readable recording medium include magnetic storage media (e.g., ROM, floppy disks, hard disks, etc.), optical recording media (e.g., CD-ROMs, or DVDs), and storage media.

According to the apparatus and method of the present invention, resolution of a 2D color image and resolution of a light intensity image, wherein the 2D color image and the light intensity image are separately obtained, are matched, at least one edge is detected from each of the matched 2D color image and the matched light intensity image, and overlapping pixels of the matched 2D color image and a depth image, which corresponds to the matched light intensity image, are matched with each other in case that the matched 2D color image and the depth image are overlapped as much as the matched 2D color image and the matched light intensity image are overlapped so that the detected edges of the matched 2D color image and the detected edges of the matched light intensity image are maximally overlapped with each other. Accordingly, even if a subject shown in the original 2D color image and a subject shown in the original depth image are not identical, and even if resolution of the original 2D color image and resolution of the original depth image are different, the 2D color image and the depth image can be quickly and accurately matched so that reliable 3D image information can be quickly obtained.

While this invention has been particularly shown and described with reference to preferred embodiments thereof, it will be understood by those skilled in the art that various changes in form and details may be made therein without departing from the spirit and scope of the invention as defined by the appended claims. The preferred embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. An image matching apparatus for matching a 2D image and a depth image, the apparatus comprising:

a resolution converter, which adjusts at least one of a first light intensity image, which corresponds to a first depth image, and a first color image, so that resolution of the first light intensity image and resolution of the first color image are identical, and outputting the adjusted first light intensity image and first color image as a second light intensity image and a second color image, respectively;

an edge detector, which receives the second light intensity image and the second color image, detects at least one edge of the second light intensity image as first edges, and detects at least one edge of the second color image as second edges; and a matcher, which matches overlapping pixels of a second depth image, which corresponds to the second light intensity image, and the second color image with each other in case that the second depth image and the second color image are overlapped as much as the second light intensity image and the second color image are overlapped so that the detected first edges and the detected second edges are maximally overlapped with each other.

2. The apparatus of claim 1, wherein the resolution converter adjusts at least one of the first light intensity image and the first color image by re-sampling at least one of the first light intensity image and the first color image.

3. The apparatus of claim 2, wherein the resolution converter outputs the first color image as the second color image, and comprises:
an up-sampler, which up-samples the first light intensity image; and
a filter, which performs low pass filtering on the up-sampled first light intensity image according to a preset filter coefficient, and outputs the result of low pass filtering as the second light intensity image.

4. The apparatus of claim 2, wherein the resolution converter outputs the first color image as the second color image, and comprises:
a filter, which performs low pass filtering on the first light intensity image according to a preset filter coefficient; and
a down-sampler, which down-samples the low pass filtered first light intensity image, and outputs the result of down-sampling as the second light intensity image.

5. The apparatus of claim 2, wherein the resolution converter outputs the first color image as the second color image, and comprises:
an up-sampler, which up-samples the first light intensity image;
a filter, which performs low pass filtering on the up-sampled first light intensity image according to a preset filter coefficient; and
a down-sampler, which down-samples the low pass filtered first light intensity image, and outputs the result of down-sampling as the second light intensity image.

6. The apparatus of claim 1, wherein the edge detector generates a first binary image, which shows the detected first edges, and a second binary image, which shows the detected second edges, and
the matcher matches the overlapping pixels of the second depth image and the second color image with each other in case that the second depth image and the second color image are overlapped as much as the second light intensity image and the second color image are overlapped so that overlapping portions of the first binary image and the second binary image are maximally identical to each other.

7. The apparatus of claim 1, wherein a photographing apparatus that obtains the first depth image and the first light intensity image is different from a photographing apparatus that obtains the first color image.

8. The apparatus of claim 1, wherein the second depth image is a result of applying a technology of obtaining the second light intensity image by using the first light intensity image, to the first depth image.

9. The apparatus of claim 1, wherein pixel values of the first light intensity image and the first color image are normalized.

10. The apparatus of claim 1, wherein each of the first depth image, the first light intensity image, and the first color image is an image in which no lens distortion exists.

11. An image matching method comprising:
adjusting at least one of a first light intensity image, which correspond to a first depth image, and a first color image so that resolution of the first light intensity image and resolution of the first color image are identical, and determining the adjusted first light intensity image and first color image as a second light intensity image and a second color image, respectively;
detecting at least one edge of the second light intensity image as first edges, and detecting at least one edge of the second color image as second edges; and
matching overlapping pixels of a second depth image, which corresponds to the second light intensity image, and the second color image with each other in case that the second depth image and the second color image are overlapped as much as the second light intensity image and the second color image are overlapped so that the detected first edges and the detected edges are maximally overlapped with each other.

12. The method of claim 11, wherein the adjusting of at least one of the first light intensity image and the first color image comprises re-sampling at least one of the first light intensity image and the first color image so that the resolution of the first light intensity image and the resolution of the first color image are identical.

13. The method of claim 11, further comprising generating a first binary image, which shows the detected first edges, and a second binary image, which shows the detected second edges,
wherein the matching of overlapping pixels comprises matching the overlapping pixels of the second depth image and the second color image with each other in case that the second depth image and the second color image are overlapped as much as the second light intensity image and the second color image are overlapped so that overlapping portions of the first binary image and the second binary image are maximally identical to each other.

14. The method of claim 11, wherein a photographing apparatus that obtains the first depth image and the first light intensity image is different from a photographing apparatus that obtains the first color image.

15. The method of claim 11, wherein the second depth image is a result of applying a technology of obtaining the second light intensity image by using the first light intensity image, to the first depth image.

16. The method of claim 11, wherein pixel values of the first light intensity image and the first color image are normalized.

17. The method of claim 11, wherein each of the first depth image, the first light intensity image, and the first color image is an image in which no lens distortion exists.

18. A non-transitory computer readable recording medium having recorded thereon a program for executing the method of claim 11.

* * * * *

UNITED STATES PATENT AND TRADEMARK OFFICE
CERTIFICATE OF CORRECTION

PATENT NO.         : 8,111,908 B2
APPLICATION NO.    : 12/076279
DATED              : February 7, 2012
INVENTOR(S)        : Jae-young Sim et al.

It is certified that error appears in the above-identified patent and that said Letters Patent is hereby corrected as shown below:

First Page Column 1 (Inventors), Line 1, Delete "Jee" and insert -- Jae --, therefor.

First Page Column 1 (Inventors), Line 2, Delete "ohang" and insert -- chang --, therefor.

First Page Column 1 (Inventors), Line 4, Delete "kyogn" and insert -- kyoon --, therefor.

Signed and Sealed this
Twenty-eighth Day of August, 2012

David J. Kappos
*Director of the United States Patent and Trademark Office*